(12) United States Patent
Morioka

(10) Patent No.: US 6,522,337 B1
(45) Date of Patent: Feb. 18, 2003

(54) IMAGE PROCESSING APPARATUS, IMAGE PROCESSING METHOD, AND RECORDING MEDIUM

(75) Inventor: Seisuke Morioka, Tokyo (JP)

(73) Assignee: Sega Enterprises, Ltd., Tokyo (JP)

( * ) Notice: Subject to any disclaimer, the term of this patent is extended or adjusted under 35 U.S.C. 154(b) by 272 days.

(21) Appl. No.: 09/603,430

(22) Filed: Jun. 23, 2000

(30) Foreign Application Priority Data

Jul. 8, 1999 (JP) .......................................... 11-193977

(51) Int. Cl.$^7$ ............................................... G06T 17/00

(52) U.S. Cl. ...................................................... 345/582

(58) Field of Search ............................... 345/418, 419, 345/582, 420, 581, 583

(56) References Cited

U.S. PATENT DOCUMENTS 6,326,964 B1 * 12/2001 Snyder et al. .............. 345/419

* cited by examiner

Primary Examiner—Cliff N. Vo
(74) Attorney, Agent, or Firm—Dickstein Shapiro Morin & Oshinsky, LLP

(57) ABSTRACT

An image processing apparatus of the present invention conducts update processing of MIPMAP-format texture data within an updateable range, and during drawing processing, it ascertains the level of detail to which texture data has been updated. Thereupon, when conducting texture mapping, texture data of the level of detail for which updating has been completed is used. In this case, if the required texture data has not been updated, then it is substituted by texture data for which updating has been completed. Consequently, even in cases where updating of all texture data is not completed in time, it is possible to prevent significant distortion of the image due to mixing of updated and non-updated texture.

4 Claims, 11 Drawing Sheets

IMAGE PROCESSING APPARATUS, IMAGE PROCESSING METHOD, AND RECORDING MEDIUM

BACKGROUND OF THE INVENTION

1. Field of the Invention

The present invention relates to an image processing apparatus and image processing method, and a recording medium storing a program for causing this image processing method to be implemented in a computer, and more particularly, it relates to an image processing apparatus, image processing method and storage medium, whereby images can be displayed without significant distortion, even in cases where updating of texture data in a particular scene is not completed in time.

2. Description of the Related Art

A game apparatus or simulation apparatus generates and displays images corresponding to the progress of a game, or the like, by executing a game program or simulation program in response to operational inputs made by an operator. For this purpose, it comprises an integral image processing apparatus and display apparatus.

The image processing apparatus comprises a geometry processing unit, rendering unit, texture processing unit, frame buffer and digital/analogue (D/A) converting unit, and the like. The geometry processing unit performs co-ordinate conversion of polygon data constituting objects. More specifically, firstly, the geometry processing unit converts polygon data from an object co-ordinates system (local co-ordinates system defining object) to a global co-ordinates system (co-ordinates system wherein objects have positional relationships). Thereupon, the geometry processing unit converts polygon data from a three-dimensional (3D) global co-ordinates system to a two-dimensional (2D) screen co-ordinates system (co-ordinates system defined on a screen). In other words, the geometry processing unit carries out perspective processing.

The rendering unit converts polygon data that has been converted to the screen co-ordinates system into image data in pixel units. The texture processing unit has a texture memory storing texture data (colours, patterns, and the like, of the surfaces of objects), and it performs texture mapping.

The image data in pixel units generated by the rendering unit is stored in the frame buffer. The digital/analogue converting unit converts the digital-format image data in pixel units stored in the frame buffer into an analogue signal, which is supplied to the display apparatus, where images are displayed.

When displaying images, high speed is required in the rendering process. Consequently, it is also necessary to access the texture memory at high speed. In general, in order to perform high-speed access, it is desirable to use an SRAM (Static Random Access Memory) as a texture memory, but compared to a DRAM (Dynamic Random Access Memory), or the like, an SRAM involves extremely high cost per unit bit (high cost with respect to capacity).

On the other hand, in order to make the displayed images more realistic, it is necessary to use more texture data, and in cases where a DRAM is used for the texture memory, due to the requirement for high-speed access to the aforementioned texture memory and the requirement of low cost of the texture memory, it is difficult to enlarge capacity very greatly.

Therefore, the required texture data is stored in an external memory (hard disk, or the like) separate from the texture memory. By providing a time period during which no drawing is performed at times when the scene of the displayed image changes and by rewriting the texture data in a portion or the whole of the texture memory during this time period, it is apparently possible to handle a large amount of texture data.

FIGS. 1A–1E illustrate modes of storing MIPMAP texture data. FIGS. 1A–1E show, for example, texture data having five levels of detail (hereinafter, called LOD, for the sake of convenience). The horizontal axis is the x axis and the vertical axis is the y axis. FIG. 1A shows texture data having LOD=0, which is the highest level of detail. This data has the highest image resolution, and the size of the x axis in this data area is Size X, whilst the size of the y axis is Size Y.

FIG. 1B shows texture data having the next level of detail LOD=1; FIG. 1C shows texture data having the next level of detail LOD=2; FIG. 1D shows texture data having the fourth level of detail LOD=3; and FIG. 1E shows texture data having the lowest level of detail LOD=4. The texture data for LOD=1 to LOD=4 is derived by reducing the texture data for LOD=0. In other words, if the LOD value of the texture data rises to 1, then the x axis and y axis are reduced to ½ (surface area to ¼).

Therefore, the higher the level of detail, the lower the LOD value and the greater the amount of data, whereas the lower the level of detail, the higher the LOD value and the smaller the amount of data. Texture data of differing levels of detail, from LOD=0 to LOD=4, is used according to the size displayed on the screen. In other words, image processing is optimized in such a manner that, if the size displayed on the screen is large, then texture data of a higher level of detail is used, and if the size displayed on the screen is small, then texture data of a lower level of detail is used.

FIGS. 2A–2E show a example of a method for updating MIPMAP texture data as shown in FIGS. 1A–1E. In the example in FIGS. 2A–2E, the updating (rewriting) process is carried out in sequence, starting from the texture data of the highest level of detail (LOD=0). FIG. 2A shows texture data 0 having LOD=0, which is the highest level of detail, FIG. 2B shows texture data 1 having LOD=1, FIG. 2C shows texture data 2 having LOD=2, FIG. 2D shows texture data 3 having LOD=3, and FIG. 2E shows texture data 4 having LOD=4, which is the lowest level of detail.

The texture data 0 having the highest level of detail has the largest volume of data, and therefore it has the longest updating time, but the image displayed thereby is the most clear. Thereupon, as the updating process proceeds through texture data 1, texture data 2, texture data 3, texture data 4, the volume of data becomes smaller and the data volume of texture data 4 is the smallest. Consequently, texture data 4 having the lowest level of detail has the shortest updating time period, but the image displayed thereby is the least distinct.

Here, the area of the texture data 0 where the texture data has been updated is taken as the updated texture data area 11 indicated by the diagonal lines, and the area where texture data has not yet been updated is taken as the non-updated texture data area 12. In this case, the data at texel 21, a texel being the picture element unit for texture data, is data for which updating has been completed, but the data at texel 22 is data which has not been updated. Therefore, since the displayed image contains a mixture of updated texture data and non-updated texture data, the image will be distorted. However, since this occurrence is undesirable, usually, texture data is used in image processing for a new scene only after it has been confirmed that updating for all texture data from texture data 0 to 4 has been completed.

Nevertheless, in cases where scenes change rapidly with the passage of time, such as in game apparatuses, there has been a problem in that the fact of having to wait for updating of MIPMAP-format texture data to be completed has interrupted the flow of scenes.

Moreover, although it is possible to regulate the volume of texture data to a smaller data volume, in order that texture data can be updated within a prescribed period of time in such a manner that the flow of scenes is not interrupted, in this case, a problem arises in that insufficient usable texture data can be created.

SUMMARY OF THE INVENTION

Therefore, it is an object of the present invention to provide an image processing apparatus whereby distortion of displayed images can be suppressed, as far as possible, in cases where updating of texture data is not completed in time when displaying a prescribed scene.

In order to achieve the aforementioned object the present invention conducts update processing of MIPMAP-format texture data within an updateable range, and during drawing processing, it ascertains the level of detail to which texture data has been updated. Thereupon, when conducting texture mapping, texture data of the level of detail for which updating has been completed is used. In this case, if the required texture data has not been updated, then it is substituted by texture data for which updating has been completed. Consequently, even in cases where updating of all texture data is not completed in time, it is possible to prevent significant distortion of the image due to mixing of updated and non-updated texture.

In order to achieve the aforementioned object, the present invention is An image processing apparatus for processing drawing pixel data by using texture data corresponding to a plurality of levels of detail, comprising:

a rendering unit for calculating the level of detail of the pixel data to be drawn; and a texture processing unit for updating at least a portion of the texture data corresponding to the plurality of levels of detail and for processing the texture data by using the level of detail of the updated texture data instead of calculated level of detail, in case that the texture data corresponding to the calculated level of detail has not yet been updated when drawing the pixel data.

In order to achieve the aforementioned object, for a more appropriate aspect of the present invention, the texture processing unit of the aforementioned image processing unit updates the texture data corresponding to the plurality of levels of detail in sequence starting from the lowest level of detail, and compares the level of detail of the updated texture data with the calculated level of detail, and processes the texture data by using the highest level of detail of the updated texture data in case that the calculated level of detail is higher than the highest level of detail of the updated texture data.

According to the present invention described above, it is possible to display images without significant distortion, even in cases where updating of texture data is not completed in time, when displaying a particular scene.

In order to achieve the aforementioned object, the present invention provides an image processing method for processing drawing pixel data by using texture data corresponding to a plurality of levels of detail, comprising the steps of:

calculating the level of detail of the pixel data to be drawn;

updating at least a portion of the texture data corresponding to the plurality of levels of detail; and processing the texture data by using the level of detail of the updated texture data instead of calculated level of detail, in case that the texture data corresponding to the calculated level of detail has not yet been updated when drawing the pixel data.

In order to achieve the aforementioned object, the present invention provides a recording medium storing a program for causing a computer to implement an image processing method for processing drawing pixel data by using texture data corresponding to a plurality of levels of detail, the image processing method comprising the steps of:

updating at least a portion of the texture data corresponding to the plurality of levels of detail; and processing the texture data by using the level of detail of the updated texture data instead of the level of detail of the pixel data.

DESCRIPTION OF THE PREFERRED EMBODIMENTS

Below, an embodiment of the present invention is described with reference to the drawings. However, this embodiment does not limit the technical scope of the present invention.

Figure 1:
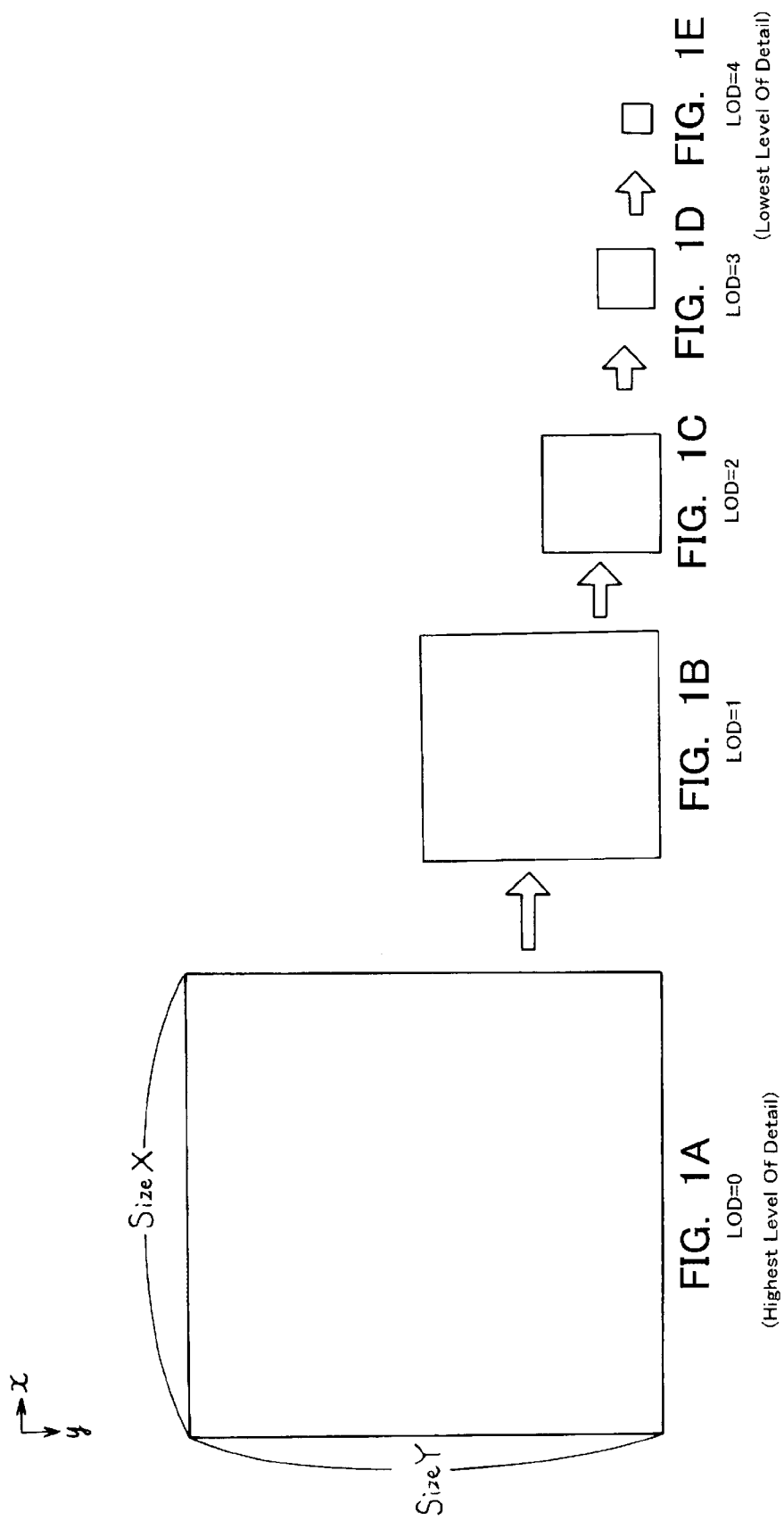
FIGS. 1A–1E are diagrams for describing modes of storing MIPMAP texture data.
Figure 2:
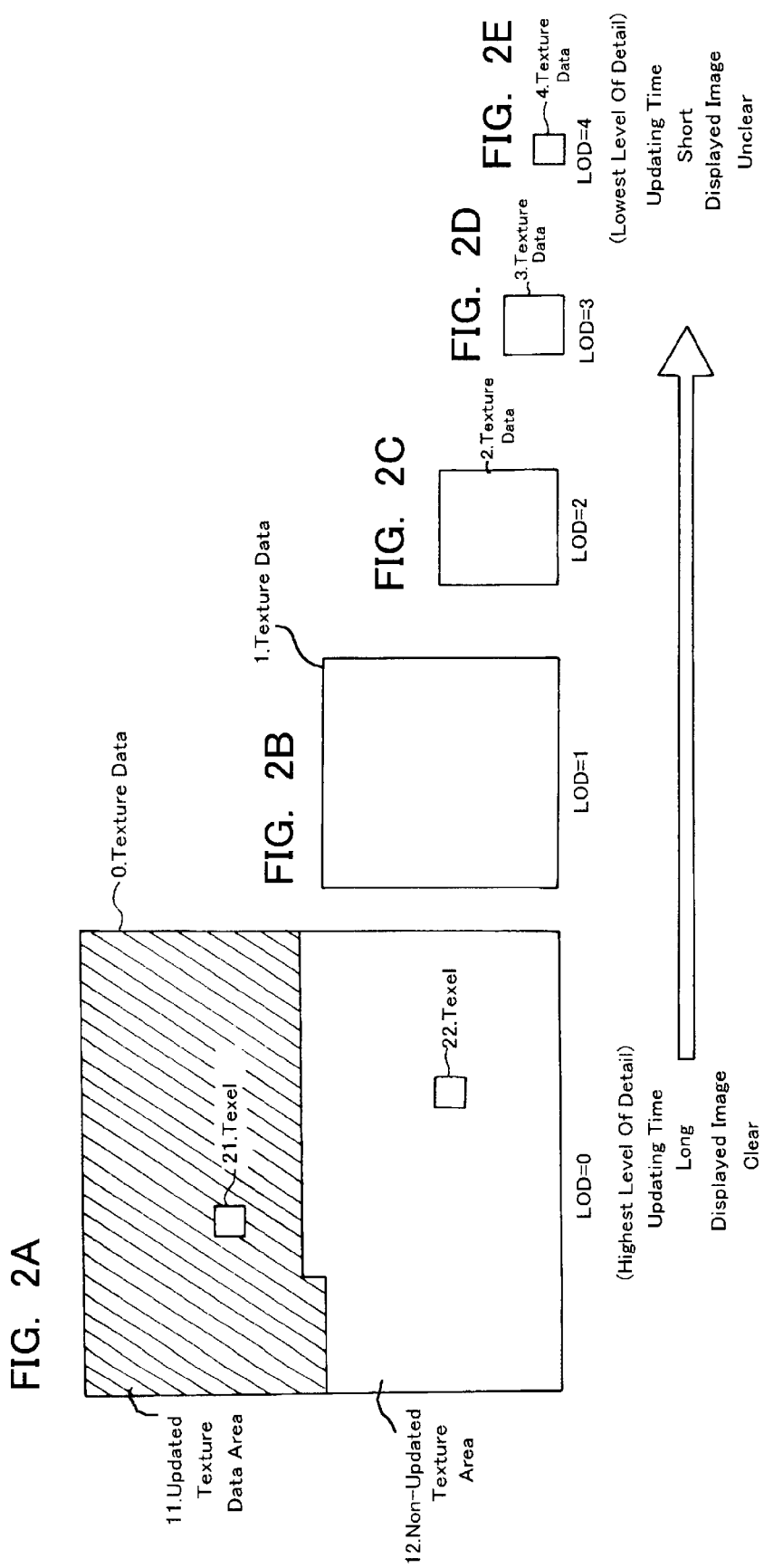
FIGS. 2A–2E are diagrams for describing an example of updating MIPMAP texture data.
Figure 3:
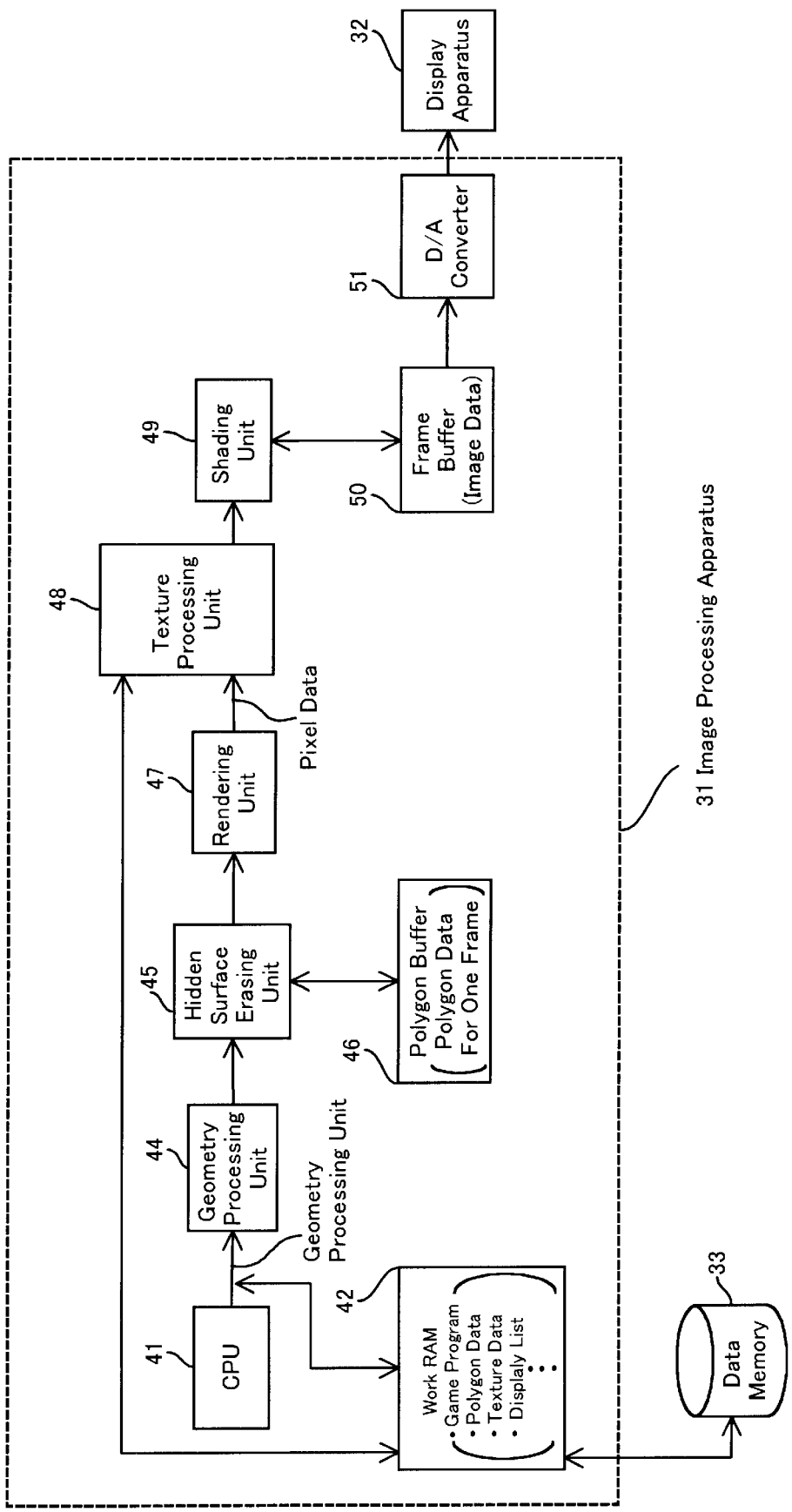
FIG. 3 is a block diagram showing the composition of one embodiment of an image processing apparatus 31 to which the present invention is applied.

FIG. 3 is a block diagram showing the composition of one embodiment of an image processing apparatus 31 to which the present invention is applied. The CPU (Central Processing Unit) 41 executes a game program previously stored in a work RAM (Random Access Memory) 42, and generates polygon data constituting objects, and viewpoint information for the displayed screen, and the like. The polygon data and display list generated by the CPU 41 is stored in, and read out from, the work RAM 42. Texture data read out from an external data memory 33 (for example, a hard disk, or the like), according to need, is also stored temporarily in the work RAM 42.

The CPU 41 supplies polygon data, which is generated in accordance with operational inputs and the game program and is defined in terms of an object co-ordinates system, to a geometry processing unit 44. The geometry processing unit 44 converts the supplied polygon data based on an object co-ordinates system to data based on a three-dimensional global co-ordinates system. Thereupon, the geometry processing unit 44 conducts perspective conversion whereby the polygon data converted to a three-dimensional global co-ordinates system is converted to a two-dimensional screen co-ordinates system. The polygon data defined in terms of a screen co-ordinates system generated by the geometry processing unit 44 in this way is stored in a polygon buffer 46. Polygon data for one frame is stored in the polygon buffer 46.

A hidden surface erasing unit 45 then conducts hidden surface erasure processing with respect to the polygon data in the polygon buffer 46. This hidden surface erasure processing involves displaying the forwardmost polygons in the display screen, on the basis of their distance from the viewpoint (Z value). The polygon data for which hidden surface erasure processing has been completed by the hidden surface erasing unit 45 is then supplied to a rendering unit 47, where rendering is carried out.

Figure 4:
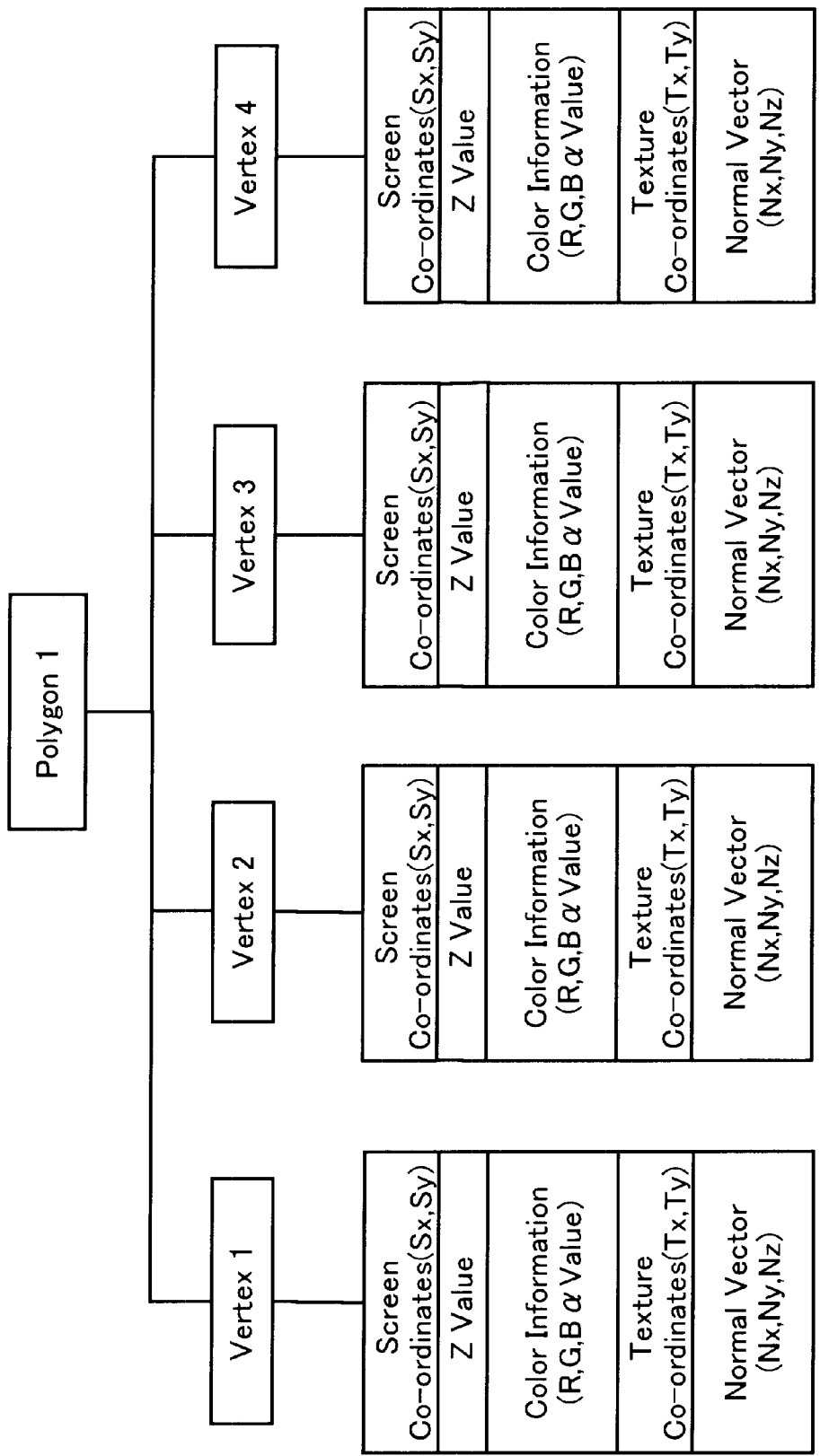
FIG. 4 is a diagram for illustrating one example of polygon data stored in the polygon buffer 46 in FIG. 3.

One example of polygon data stored in the polygon buffer 46 is shown in FIG. 4. This diagram shows one example of vertex data constituting a polygon 1. In this example, polygon 1 is constituted by four vertex data. Data for vertex 1 comprises: screen co-ordinates indicating a position on a display screen (Sx, Sy); a Z value indicating a depth in the display screen; colour information (R, G, B, a value); texture co-ordinates (Tx, Ty); a normal vector (Nx, Ny, Nz); and the like. Data for vertex 2, vertex 3 and vertex 4 is constituted similarly to the data for vertex 1.

The polygon data stored in the polygon buffer 46 is read out as appropriate, and when hidden surface erasure processing has been completed, data for the polygons to be displayed is supplied to the rendering unit 47. The rendering unit calculates a LOD (level of detail), on the basis of the size of the supplied polygon data. For example, if the polygon data is larger in size, then the level of detail is set to a higher level (low LOD value), and if the polygon data is smaller in size, then the level of detail is set to a lower level (high LOD value). In other words, texture data of optimum resolution with respect to the size displayed on the screen is selected. Thereupon, the rendering unit 47 converts the polygon data to pixel data as illustrated in FIG. 5.

Figure 5:
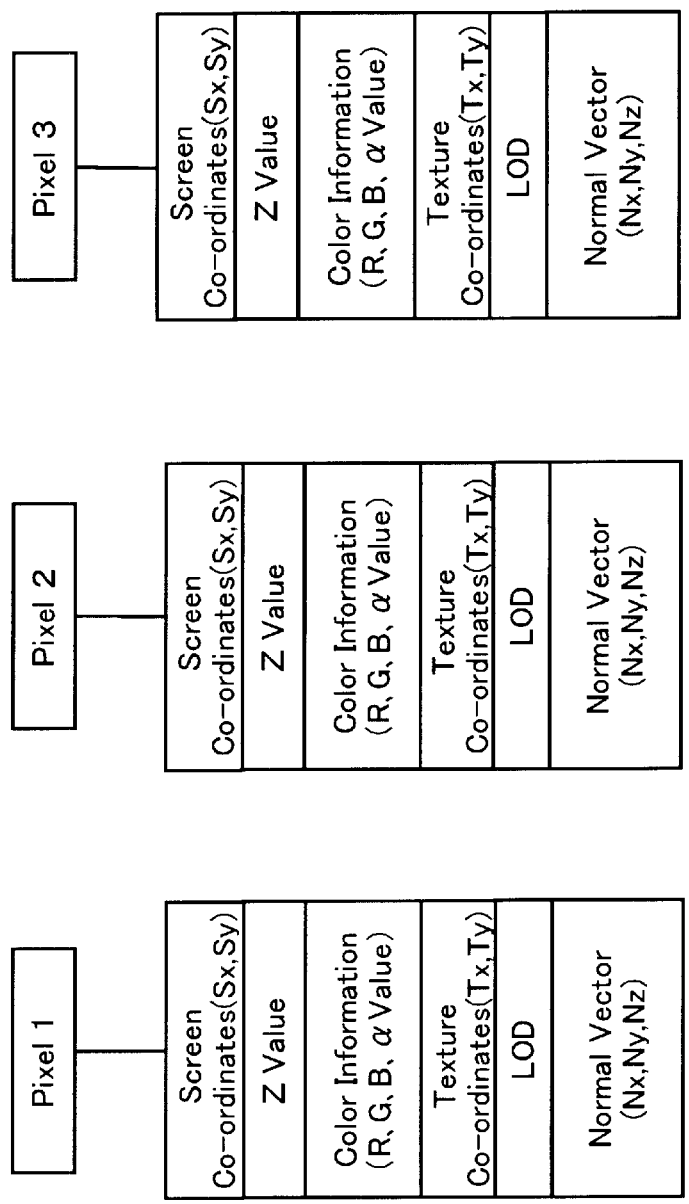
FIG. 5 is a diagram showing one example of pixel data output by the rendering unit 47 in FIG. 3.

FIG. 5 shows data for three pixels in a polygon, as calculated from the four vertex data constituting the polygon 1 shown in FIG. 4. Pixel 1 is constituted by screen co-ordinates (Sx, Sy), a Z value, colour information (R, G, B, α value), texture co-ordinates (Tx, Ty), LOD (level of detail), and a normal vector (Nx, Ny, Nz). The data for pixel 2 and pixel 3 is constituted similarly to the data for pixel 1. This pixel data is generally calculated by perspective interpolation.

Figure 6:
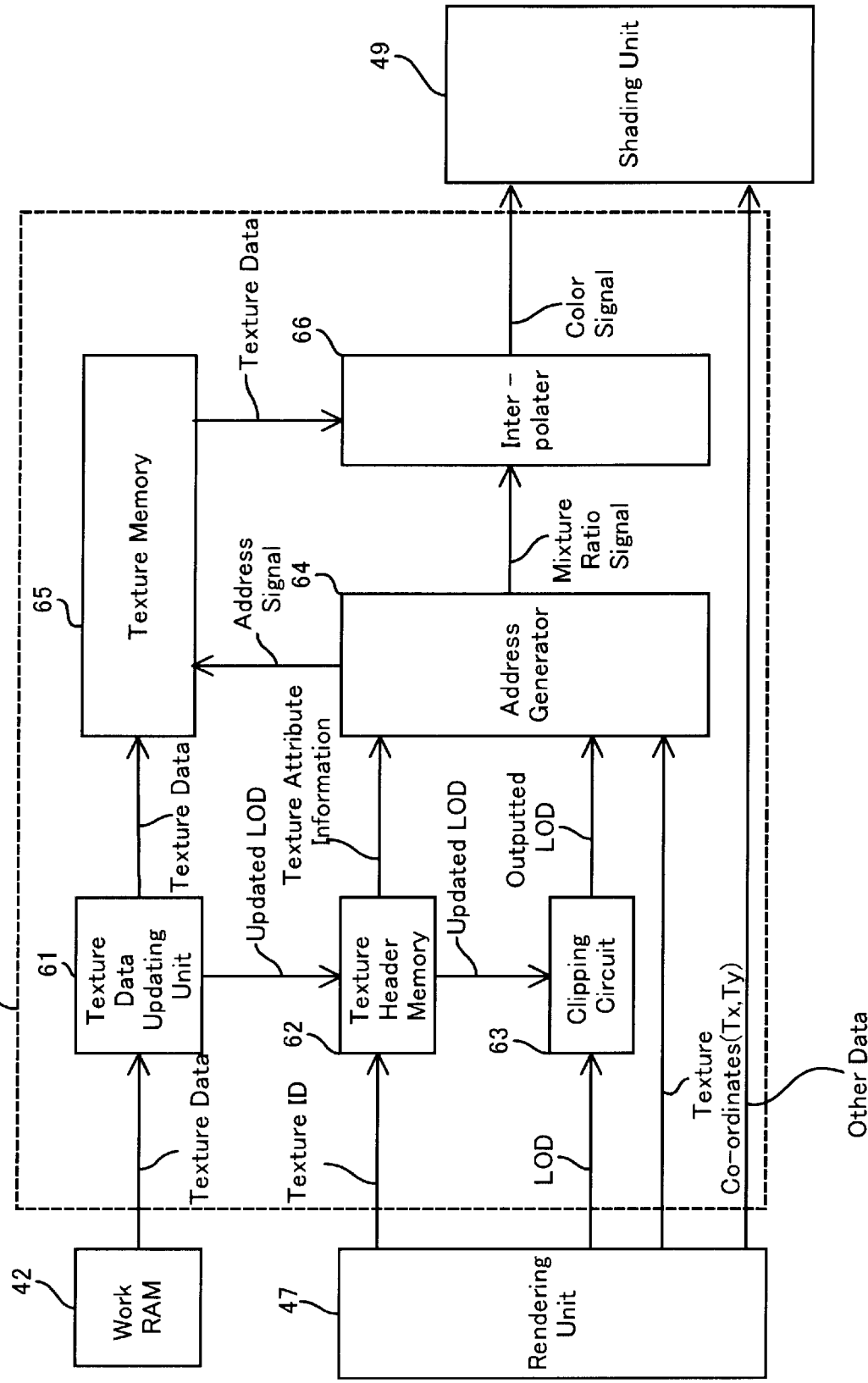
FIG. 6 is a block diagram showing an example of the composition of the texture processing unit 48 in FIG. 3.

The pixel data generated by the rendering unit 47 is supplied to a texture processing unit 48. FIG. 6 shows an example of the composition of the texture processing unit 48. The texture processing unit 48 carries out texture mapping. Texture data read out from the work RAM 42 is supplied to the texture data updating unit 61. This texture data updating unit 61 records and updates the supplied texture data in a texture memory 65.

Figure 7:
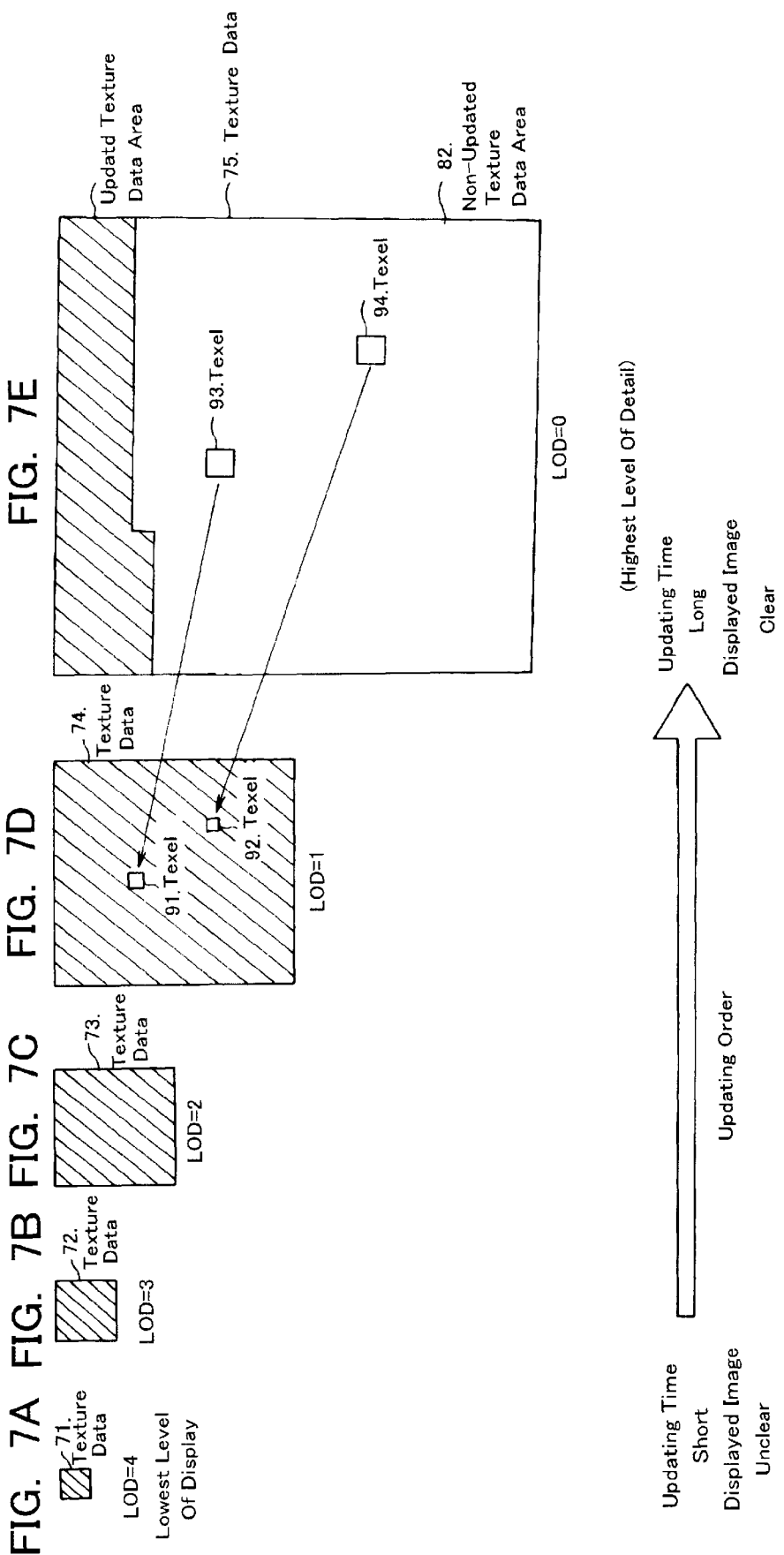
FIGS. 7A–7E are diagrams for describing an example of updating MIPMAP texture data in the present invention.

As illustrated in FIGS. 7A–7E, the updating of the MIPMAP texture data is carried out in sequence from the texture data 71 of lowest level of detail (LOD=4) to the texture data of higher level of detail (lower LOD value). FIG. 7A shows texture data 71 of LOD=4 (lowest level of detail), FIG. 7B shows texture data 72 of LOD=3, FIG. 7C shows texture data 73 of LOD=2, FIG. 7D shows texture data 72 of LOD=1, and FIG. 7E shows texture data 71 of LOD=0 (highest level of detail). In the example in FIGS. 7A–7E, firstly, texture data 71 of LOD=4 (lowest level of detail) is updated, and then texture data 72 (LOD=3) is updated. Thereupon, texture data 73 (LOD=2) through to texture data 75 (LOD=0) are updated in sequence. The texture data having the lowest level of detail (highest LOD value) have a small data volume, and therefore the updating process for this data is completed in a short period of time. Therefore, even if the time period for updating processing is short, there is a higher probability that updating for texture data of a lower level of detail will have been completed. Consequently, even in cases where updating has not been completed for texture data of all levels of detail, it is more reliable that updating of texture data of a lower level of detail will have been completed.

In FIGS. 7A–7E, it is assumed that updating of the MIPMAP-format texture data starts with texture data 71 of LOD=4, and is ended partway through texture data 75 having the highest level of detail of LOD=0. The obliquely shaded updated texture data area is the area where data has been updated, and the non-updated texture data area 82 is the area where data has not yet been updated.

The texture data updating unit 61 supplies the level of detail for which updating has been completed (hereinafter, called the 'updated LOD value', for the sake of convenience,) to a texture header memory 62. In the example in FIGS. 7A–7E, the texture data updating unit 61 supplies the updated LOD value (LOD=1) to the texture header memory 62.

Attribute information for texture corresponding to a texture ID is previously stored in the texture header memory 62. This texture attribute information comprises, for example, storage position data for the texture data corresponding to the texture ID in the texture memory 65. This storage position data typically constitutes the origin and size of the storage area. The rendering unit 47 supplies the texture ID in the generated pixel data to the texture header memory 62. The texture header memory 62 converts the supplied texture ID to corresponding texture attribute information, and this texture attribute information is then supplied to an address generator 64. The texture header memory 62 records the updated LOD value (in the example in FIG. 7, LOD=1) supplied by the texture data updating unit 61, and supplies it to a clipping circuit 63.

The rendering unit 47 supplies the LOD value (level of detail) in the generated pixel data to the clipping circuit 63. The clipping circuit 63 compares the LOD value supplied by the rendering unit 47 (for example, LOD=0) with the updated LOD value supplied by the texture header memory 62 (in the example in FIG. 7, LOD=1), and it outputs the higher LOD value (lower level of detail). In other words, in the example in FIG. 7, LOD=1 is output. Namely, the supplied LOD value is clipped to the updated LOD value.

In this case, texel data 93 and 94 having LOD=0 (highest level of detail) have not yet been updated, but the corresponding texel data 91 and 92 having LOD=1 have already been updated. Consequently, in cases where texture data of LOD=0 is demanded, rather than accessing the texture data in texels 93 and 94 of texture data 75, which has not been updated, instead, the texels 91 and 92 in texture data 74 of the level of detail one below (LOD value one above) are accessed and read out. Consequently, there is no display of texture data which has not been updated, and hence there is no significant distortion of images. The LOD value (level of detail) output by the clipping circuit 63 is supplied to the address generator 64.

The rendering unit 47 supplies the texture co-ordinates (Tx, Ty) in the generated pixel data to the address generator 64. The rendering unit 47 then supplies the texture ID, LOD value, and pixel data other than the texture co-ordinates (Tx, Ty) to a shading unit 49. The address generator 64 generates a corresponding address in the texture memory 65, from the supplied texture attribute information (for example, the origin and size of the storage area), the LOD value (level of detail) and the texture co-ordinates (Tx, Ty), and it stores the generated address signal in the texture memory 65.

Figure 8:
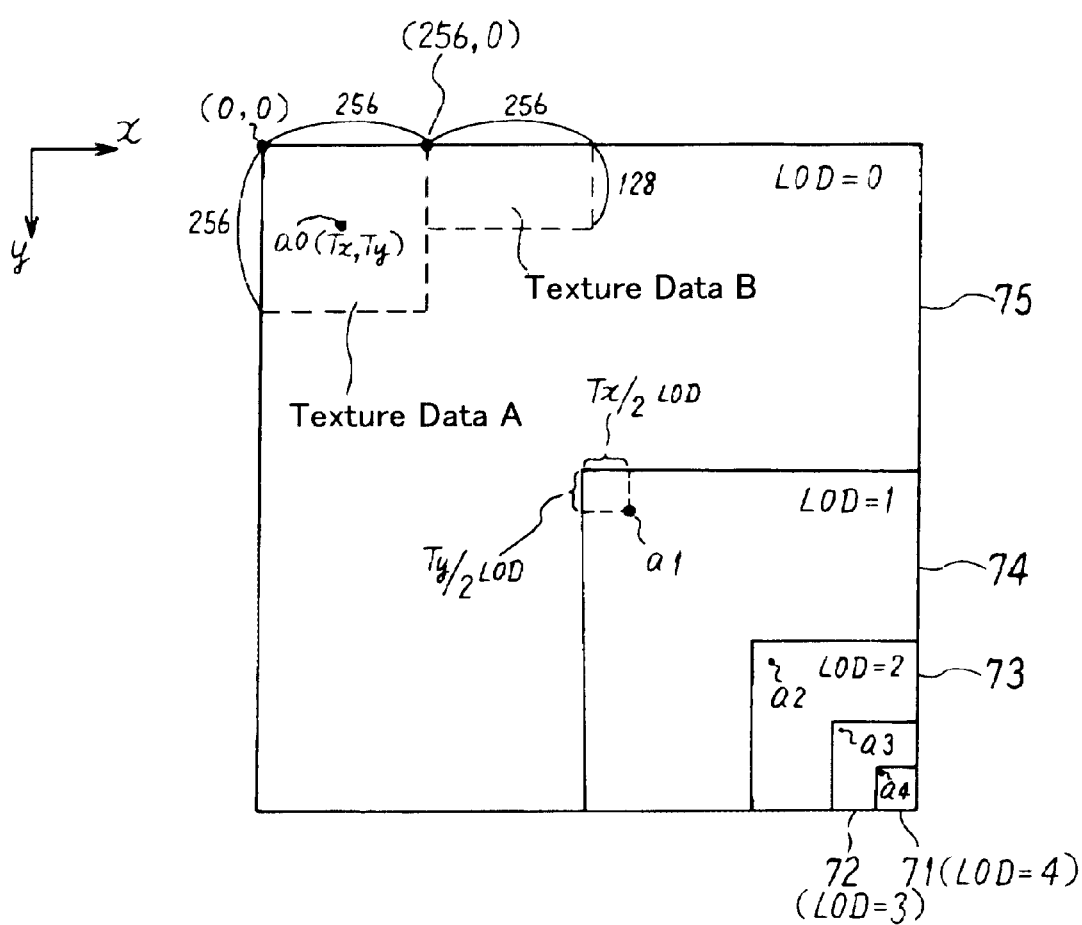
FIG. 8 is a diagram for describing MIPMAP texture data on a texture co-ordinates system.

FIG. 8 shows one example of MIPMAP-format texture data on a texture co-ordinates system. In the example in FIG. 8, the horizontal axis is the x axis and the vertical axis is the y axis. The storage areas for the texture data 75 through to 71 having LOD=0 (highest level of detail) to LOD=4 (lowest level of detail) have respectively analogous shapes, as shown in the diagram. Texture data A and texture data B corresponding to the texture ID are displayed on the texture data 75 having LOD=0. Texture data A is expressed by origin (0,0) and size (256,256). Texture data B is expressed by origin (256,0) and size (256,128). These storage position data (origin and size) are the aforementioned texture attribute information. Texel a0 (Tx, Ty) is located on texture data A. Texels a1, a2, a3 and a4 represent texels corresponding to texel a0 at the different levels of detail from LOD 1 to LOD 4.

The method for calculating address co-ordinates in the texture memory 65 is now described with reference to texture data A. The address generator 64 identifies the address of texture data A (texel a0) in the texture data 75 having LOD=0, on the basis of the origin (0,0) and size (256,256) forming the attribute information for texture data A, and the texture co-ordinates (Tx, Ty). Thereupon, the address generator 64 calculates the texture co-ordinates (address) of the texel corresponding to texel a0 (Tx, Ty) on the basis of the supplied LOD value. These co-ordinates are calculated by using formulae (1) and (2) below.

$$X = Tx/2^{LOD} \quad (1)$$

$$y = Ty/2^{LOD} \quad (2)$$

Consequently, if the LOD value is 1, for example, then the co-ordinates of texel a1 will be calculated as (Tx/2, Ty/2), with respect to the origin of the texture data 74.

Moreover, the address generator 64 also generates a texture data mixture ratio signal, on the basis of the supplied texture attribute information, the LOD value (level of detail) and the texture co-ordinates (Tx, Ty), and the generated mixture ratio signal is supplied to an interpolator 66.

Figure 9:
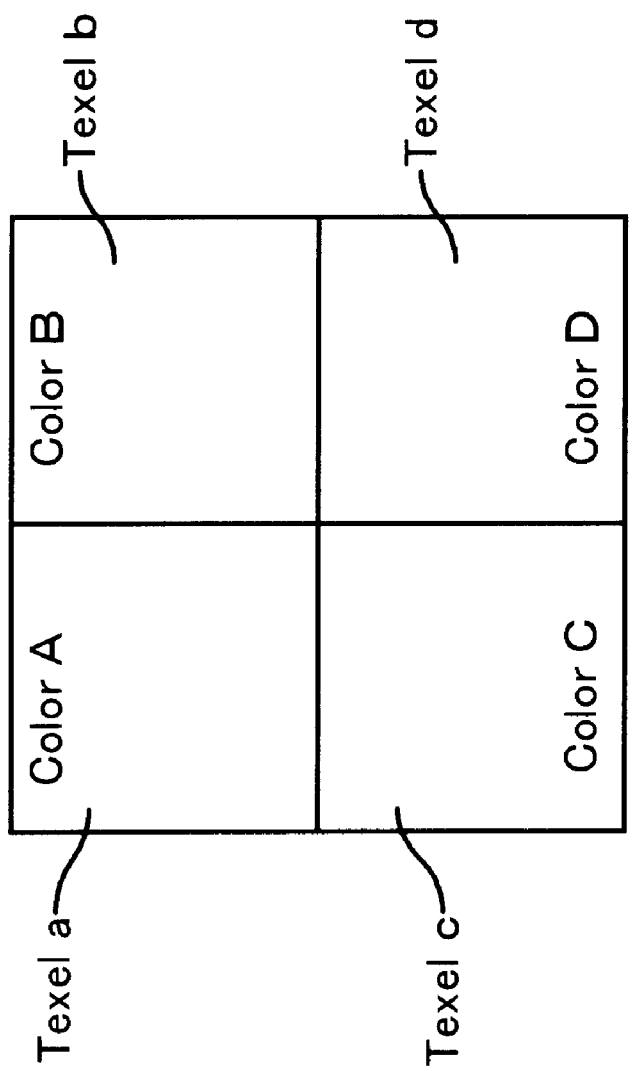
FIG. 9 is a diagram for describing a mixture ratio signal output by the address generator 64 in FIG. 6.

A method for generating colour data by means of a bilinear filter is now described with reference to FIG. 9. FIG. 9 is an example wherein one pixel corresponds to a plurality of texels (texel a to texel d). In FIG. 9, the horizontal axis is the x axis and the vertical axis is the y axis. Taking the smaller portion of x as ftx and the smaller portion of y as fty, for the mixture ratio signal, and taking the colours of the respective texels a to d as A, B, C, D, the colour data based on a bilinear filter is calculated from formula (5), by means of equations (3) and (4).

$$Tmp0 = A \cdot (1-ftx) + B \cdot ftx \quad (3)$$

$$Tmp1 = C \cdot (1-ftx) + D \cdot ftx \quad (4)$$

$$\text{Colour data} = Tmp0 \cdot (1-fty) + Tmp1 \cdot fty \quad (5)$$

When the address signal is supplied to the texture memory 65, the corresponding texture data is read out and the read out texture data is supplied to the interpolator 66. The interpolator 66 conducts the aforementioned bilinear filtering process on the basis of the supplied texture data and mixture ratio signal. Here, filtering is carried out because there is not necessarily a one-to-one correspondence between the pixels in the display screen and the texels in the texture memory, and in the example in FIG. 9, one pixel (picture element) corresponds to a plurality of texels. The processing implemented by the interpolator 66 is not limited to bilinear filtering, for example, it may also carry out trilinear filtering. As stated previously, bilinear filtering is a method for filtering from 4 texels in a single texture map. Trilinear filtering is a method whereby bilinear filtering from 4 texels is carried out respectively for two consecutive MIPMAP data, and interpolation is then performed between the two MIPMAP data according to the smaller LOD (interpolating for a total of 8 texels). The interpolator 66 supplies the filtered colour signal to the shading unit 49.

Returning to FIG. 3, the shading unit 49 conducts shading processing. For example, the colour data of pixels is adjusted in accordance with the colour and position of the light source. The shaded image data generated by the shading unit 49 is then supplied to a frame buffer 50, where it is stored temporarily. The digital-format image data stored in the frame buffer 50 is supplied to a digital/analogue (D/A) converting unit 51. The analogue signal generated by the digital/analogue (D/A) converting unit 51 is then supplied to the display apparatus 32 and displayed on a screen.

Figure 10:
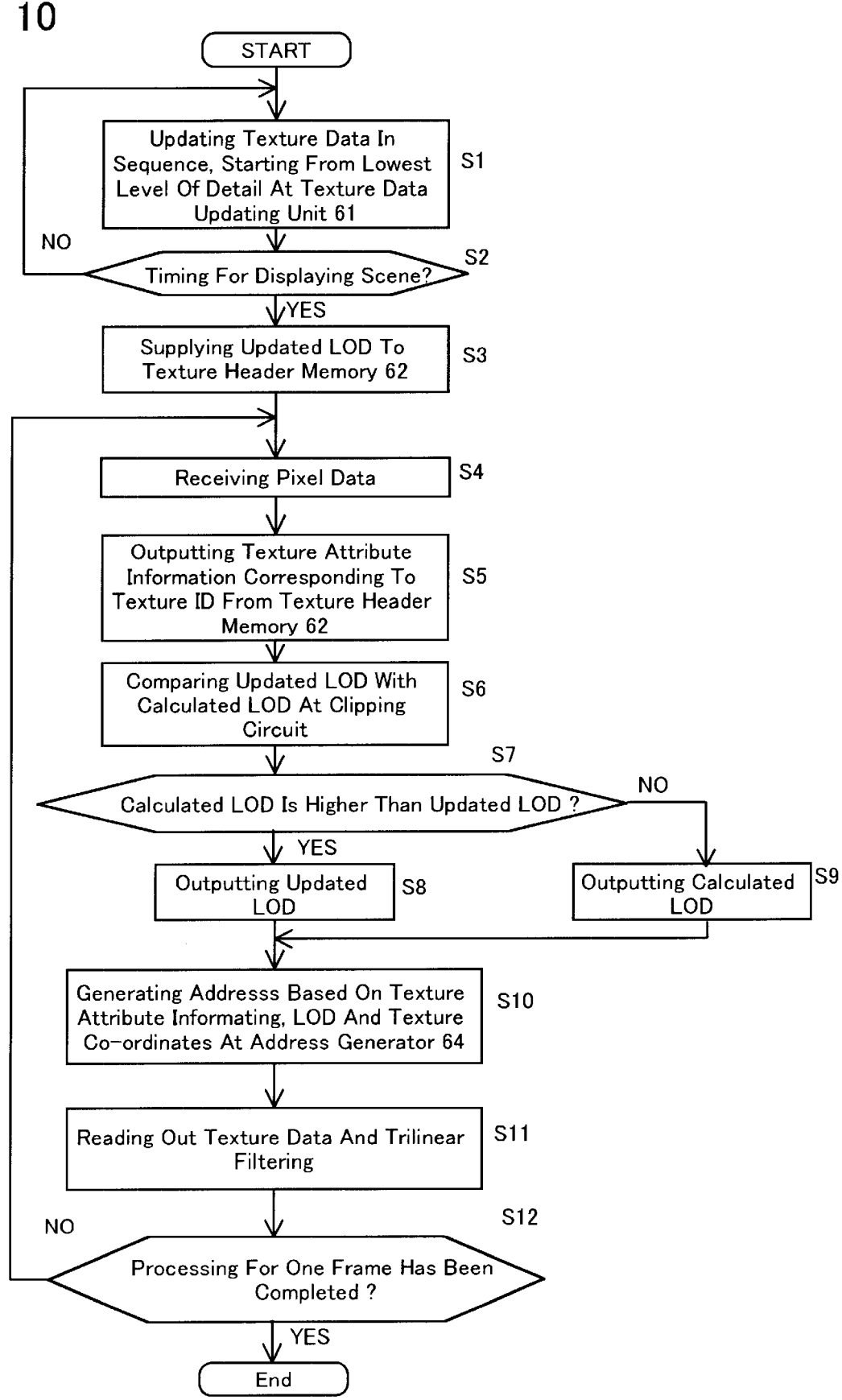
FIG. 10 is a flowchart for describing the processing operation of the texture processing unit 48.

Next, the processing operations conducted by the texture processing unit 48 are described with reference to the flowchart in FIG. 10. Firstly, at step S1, when the texture data read out from work RAM 42 is supplied to the texture data updating unit 61, the texture data updating unit 61 updates the texture data and the updated texture data is stored in the texture memory 65. This texture data updating process is carried out in sequence, starting from the texture data of the lowest level of detail (highest LOD value).

At step S2, the texture data updating unit 61 determines whether or not the updating time period has ended and the timing for displaying the scene has been reached. If it is determined at step S2 that the timing for displaying a scene has been reached, then the routine returns to step S1, and texture data updating processing is executed again. If it is determined at step S2 that the timing for displaying the scene has been reached, then the routine moves on to step S3.

At step S3, the texture data updating unit 61 ends the updating of texture data and supplies the updated LOD value to the texture header memory 62, where it is stored. At step S4, pixel data (texture ID, LOD, texture co-ordinates (Tx, Ty), and other data) is supplied from the rendering unit 47 to the texture processing unit 48.

At step S5, when texture ID is supplied to the texture header memory 62, then the texture header memory 62 converts the texture ID to corresponding texture attribute information, and this texture attribute information is supplied to the address generator 64. The texture header memory 62 supplies the temporarily stored updated LOD value to the clipping circuit 63.

At step S6, the clipping circuit 63 compares the LOD value (level of detail) supplied by the rendering unit 47 with the updated LOD value supplied by the texture header memory 62.

At step S7, the clipping circuit 63 determines whether the LOD value (level of detail) supplied by the rendering unit 47 is smaller than the updated LOD value, in other words, whether or not the level of detail thereof is higher. At step S7, if it is judged that the LOD value (level of detail)

supplied by the rendering unit 47 is smaller than the updated LOD value, in other words, if the level of detail is higher, then the routine proceeds to step S8, where the clipping circuit 63 clips the LOD value to the updated LOD value and supplies this updated LOD value to the address generator 64. If, at step S7, it is determined that the LOD value (level of detail) supplied by the rendering unit 47 is not smaller than the updated LOD value, in other words, if it is not a higher level of detail, then the routine proceeds to step S9, where the clipping circuit 63 outputs the LOD value supplied by the rendering unit 47, without alteration, to the address generator 64.

At step S10, the address generator 64 generates a corresponding address in the texture memory 65 on the basis of the supplied texture attribute information, LOD value (level of detail), and texture co-ordinates (Tx, Ty), and the generated address signal is supplied to the texture memory 65.

At step S11, texture data is read out from the supplied address signal, and the texture data read out is supplied to the interpolator 66. The interpolator 66 carries out trilinear filtering on the basis of the supplied texture data, and outputs a colour signal.

At step S12, it is determined whether or not the processing of texture data for one frame has been completed, and if it is determined that the processing of texture data for one frame has not been completed, then the routine returns to step S4, and the processing in steps S4 through to S12 is carried out again. If it is determined at step S12 that texture data processing for one frame has been completed, then the processing operation is completed.

In this embodiment of the present invention, it is also possible to calculate the optimum combination of updateable LOD values previously on the basis of the texture updating time, in such a manner that texture data having these calculated LOD values is updated. In this case, the updated LOD values may be at sporadic intervals. When rendering, if the calculated LOD value is not yet updated, then rendering is carried out by using texture data for the nearest LOD value which has been updated.

Figure 11:
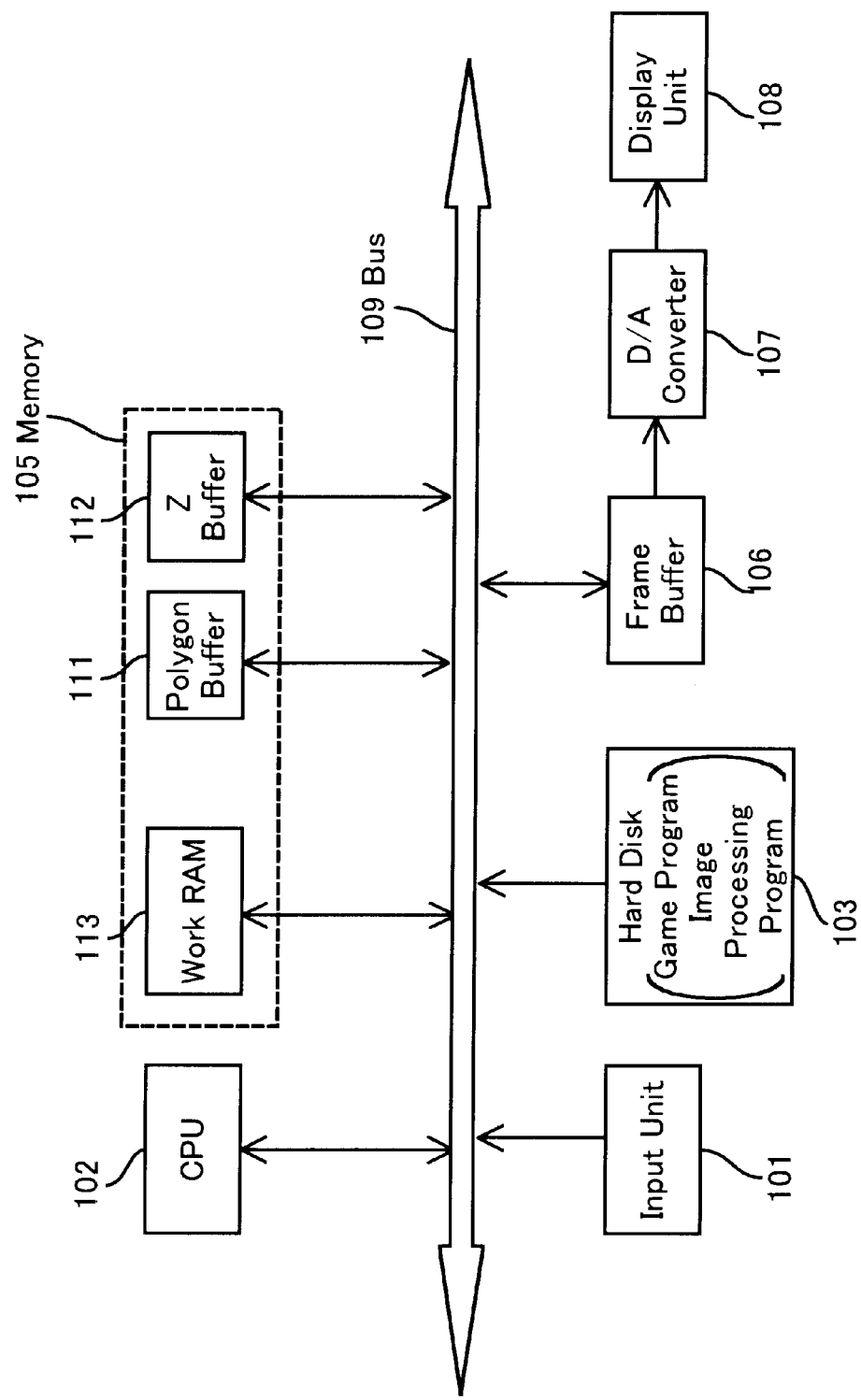
FIG. 11 is a block diagram showing a further embodiment to which the present invention is applied.

FIG. 11 is a block diagram showing the composition of a further embodiment to which the present invention can be applied. In the image display apparatus 31 shown in FIG. 3, the geometry processing unit 44, hidden surface erasing unit 45, rendering unit 47, texture processing unit 48 and shading unit 49 are implemented by dedicated hardware, but in the example shown in FIG. 11, all or a portion of image processing, such as geometry processing, hidden surface erasing, rendering, texture processing, shading, and the like, is implemented by a general-purpose computer by means of a computer program.

An input unit 101, CPU 102, hard disk 103, memory 105 and frame buffer 106 are mutually connected by means of a bus 109. An operator inputs operating information by controlling the input unit 101. A game program and an image processing program are previously stored on the hard disk 103. The CPU 102 reads out and executes the game program and image processing program from the hard disk 103, as and when necessary. Data, or the like, required by the CPU 102 when executing the program is stored in a work RAM 113 in the memory 105, as and when necessary.

Polygon data for one frame is stored in a polygon buffer 111 in the memory 105, and a Z value is stored in a Z buffer 112. The generated image data is stored in the frame buffer 106. Image data read out from the frame buffer 106 is supplied to the digital/analogue (D/A) converting unit 107. The digital/analogue (D/A) converting unit 107 converts the supplied digital data (image data) to an analogue signal, which is displayed on the display unit 108.

As a storage medium providing a user with a computer program for executing the aforementioned processing, in addition to an information storage medium, such as a magnetic disk, CD-ROM, or the like, it is also possible to include network-based transmission media, such as the Internet, digital satellites, or the like.

As described above, according to the present invention, since updating of MIPMAP-format texture data is carried out starting from the lowest level of detail, and it is recorded up to which level of detail the updating of texture data has been completed, then even in cases where updating of texture data has not been completed in time, it is possible to conduct texture processing using texture data having a lower level of detail, which has been completed. Consequently, it is possible to prevent significant distortion of images, such as mixing of updated and non-updated texture data, for example.

The scope of protection of the present invention is not limited to the above-described aspects of the invention, but rather extends to the invention disclosed in the claims, and to equivalents thereof.

What is claimed is:

1. An image processing apparatus for processing drawing pixel data by using texture data corresponding to a plurality of levels of detail, comprising:

a rendering unit for calculating the level of detail of the pixel data to be drawn; and a texture processing unit for updating at least a portion of the texture data corresponding to the plurality of levels of detail and for processing the texture data by using the level of detail of the updated texture data instead of the calculated level of detail if the texture data corresponding to the calculated level of detail has not yet been updated when drawing the pixel data.

2. The image processing apparatus according to claim 1, wherein the texture processing unit updates the texture data corresponding to the plurality of levels of detail in sequence starting from the lowest level of detail, and compares the level of detail of the updated texture data with the calculated level of detail, and processes the texture data by using the highest level of detail of the updated texture data in case that the calculated level of detail is higher than the highest level of detail of the updated texture data.

3. An image processing method for processing drawing pixel data by using texture data corresponding to a plurality of levels of detail, comprising the steps of:

calculating the level of detail of the pixel data to be drawn;

updating at least a portion of the texture data corresponding to the plurality of levels of detail; and processing the texture data by using the level of detail of the updated texture data instead of the calculated level of detail if the texture data corresponding to the calculated level of detail has not yet been updated when drawing the pixel data.

4. A recording medium storing a program for causing a computer to implement an image processing method for processing drawing pixel data by using texture data corresponding to a plurality of levels of detail, the image processing method comprising the steps of:

updating at least a portion of the texture data corresponding to the plurality of levels of detail; and processing the texture data by using the level of detail of the updated texture data instead of the level of detail of the pixel data.

* * * * *